United States Patent

[11] 3,607,986

[72] Inventors Patrick W. Ager
West Chester, Pa.;
Louis A. Graham, Greensboro, N.C.
[21] Appl. No. 781,974
[22] Filed Dec. 6, 1968
[45] Patented Sept. 21, 1971
[73] Assignee FMC Corporation
Philadelphia, Pa.

[54] VINYL CHLORIDE-PROPYLENE COPOLYMER MODIFIED POLYPROPYLENE
6 Claims, No Drawings

[52] U.S. Cl. .................................................. 260/897 C,
8/100, 8/180, 260/41 C, 264/78
[51] Int. Cl. ............................................... C08f 29/12
[50] Field of Search .......................................... 260/897,
899

[56] References Cited
UNITED STATES PATENTS
3,046,237  7/1962  Rosenfelder et al. .......... 260/23
3,303,148  2/1967  Joyner ........................... 260/17

OTHER REFERENCES

Topchiev et al.— Polyoletins (Text Book)— 1962 pp. 87–89

Primary Examiner—Murray Tillman
Assistant Examiner—C. J. Seccuro
Attorneys—Thomas R. O'Malley, George F. Mueller and Charles A. Haase ABSTRACT: A polypropylene composition comprising polypropylene containing a minor amount of a vinyl chloride-propylene copolymer.

VINYL CHLORIDE-PROPYLENE COPOLYMER MODIFIED POLYPROPYLENE

This invention relates to filament- and film-forming polypropylene compositions. More particularly, it relates to filament- and film-forming polypropylene compositions which can be readily dyed with dispersed dyes.

It is known that polypropylene can be used to produce fibers and films which exhibit excellent chemical and physical properties which make them particularly useful for many purposes. However, it is similarly known that polypropylene cannot be dyed with dispersed dyes with the utilization of normal techniques. Additionally, various attempts to improve the receptivity of polypropylene to various types of dyes by the addition of certain additives has not been successful due to the fact that many modifying additives do not produce compatible blends with polypropylene. Such incompatibility results in polypropylene compositions which exhibit poor physical properties such that they are not suitable for filament and film forming purposes.

It is therefore an object of the present invention to prepare polypropylene compositions which can be readily dyed with dispersed dyes.

Another object of this invention is to prepare polypropylene compositions which exhibit excellent compatibility.

A further object of the present invention is to prepare a polypropylene composition which exhibits along with dyeability and compatibility, excellent physical properties making such a resin suitable for filament- and film-forming purposes.

In accordance with the present invention, it has been determined that the above and related objects can be obtained with a polypropylene composition comprising polypropylene containing a minor portion of a vinyl chloride-propylene copolymer.

The present polypropylene compositions or blends not only result in compositions which are dyeable with dispersed dyes but also results in compositions which are very compatible. According to the prior art, blends of vinyl chloride and olefins such as polypropylene are considered to be relatively incompatible. However, it has been determined that the polypropylene compositions of the present invention exhibit excellent compatibility.

The polypropylene used to prepare the present compositions can be any of those which are commercially available which are suitable for filament- and film-forming purposes. Normally such polypropylenes have a density of about 0.90 to 0.92. Such polyproplenes are principally isotactic in structure.

The normally solid vinyl chloride-propylene copolymers which are used according to the present invention to modify polypropylene are comprised of random units of vinyl chloride and propylene. It has been determined that vinyl chloride-propylene copolymers containing about at least 8 percent by weight of combined propylene and not in excess of about 40 percent of combined propylene can be used for blending with polypropylene resin to obtain the desired results. HOwever, it has been found that the preferred vinyl chloride-propylene copolymers for use in the present compositions from the standpoint of optimum dyeability and compatibility are those containing between about 12 percent and 25 percent by weight of combined propylene. One commercially available copolymer product coming within the above description is marketed under the designation Airco 420 Propylene-Modified PVC Resin by the Airco Chemicals and Plastics Company, New York, N.Y.

The amount of vinyl chloride-propylene copolymer which must be blended with polypropylene resin according to the present invention to achieve the desired results may be varied over a rather large range. In general, it has been determined that the dyeability of polypropylene filaments with dispersed dyes can be greatly increased with the addition or blending of as little as 1 percent of the above-described vinyl chloride-propylene copolymer based on the combined total weight of resin blend. Normally, for most requirements, it is not necessary to incorporate more than 30 percent of the said polyvinyl chloride-propylene copolymer resin. However, in most instances in view of relative depth of dyeability and physical properties obtained, it is preferred to use polypropylene compositions of the present invention which contain from about 5 percent to 20 percent of the present vinyl chloride-propylene copolymer.

The present compositions can be prepared by any convenient method wherein the two components are uniformly blended. For instance, the polypropylene and vinyl chloride-propylene copolymer can be dry blended at room temperature or the like and then the resulting uniform blend can be melt extruded into the desired finished product. Additionally, the subject components can be blended together at elevated temperatures on suitable rolls, in a Banbury mixer, or with other suitable-type processing equipment wherein a uniform intimate blend of the polymers can be readily obtained before they are introduced into extrusion apparatuses for the forming of desired product forms.

It may be desirable to add to the subject compositions various additives. For instance, the end use of the product may indicate that various stabilizers, delustrants, and other known additives are required. In this case such additives can be incorporated into the subject polymer blend during the blending cycle wherein the polymer components are mixed either at room or at elevated temperatures.

The polymer blends of the present invention can be spun into fibers or films by conventional spinning techniques. For example, the compositions can be melt spun into filaments which can be stretched to orient the molecules and develop the desired tensile strength in the fibers.

The following example will further illustrate several preferred embodiments of the present invention:

EXAMPLE

Eight one-pound batches of polypropylene containing various amounts of a vinyl chloride-propylene copolymer (samples B to I in the following table) containing about 15 percent by weight of combined propylene and about 85 percent by weight of combined vinyl chloride were prepared by initially blending the polypropylene and the vinyl chloride-propylene copolymer in a drum tumbler for 30 minutes. The polypropylene used was Avisun's 5078. The blends of polypropylene and vinyl chloride-propylene copolymer were spun in a 1-inch extruder using a medium compression ratio polyolefin-type screw at a temperature range between about 401° F. and 420° F. Sample A (control) in the following table was composed of polypropylene with no resin modifier and was spun under identical conditions.

The spun yarns were drawn at draw ratios between about 2.75 and 3.00 to give final drawn deniers ranging from about 450 for 34 filaments to 500 for 34 filaments. This yarn was further drawn and processed and texturized to produce a final carpet yarn having a denier of approximately 3,000 for 204 filaments. The texturized yarns were then tufted into 4-inch strips in a sample carpet and dyed competitively in the same dye bath containing 2 percent Latyl Blue RB dispersed dye and 20 percent Latyl Carrier A, both percentages being based on the weight of the sample carpet.

The following table summarizes the dyeability and physical properties of the above-prepared yarns with respect to the various concentrations of vinyl chloride-propylene copolymer blended with polypropylene:

TABLE

| Sample | Percent vinyl chloride-propylene copolymer | Tenacity | Elongation | Dye pick-up* |
|---|---|---|---|---|
| A | 0 | 2.61 | 88.9 | 0 |
| B | 5 | 2.45 | 87.6 | 1 |
| C | 7½ | 2.39 | 84.4 | 1 |
| D | 10 | 2.45 | 66.7 | 2 |
| E | 12½ | 2.20 | 72.3 | 3 |
| F | 15 | 1.99 | 56.1 | 3 |
| G | 20 | 1.86 | 22.7 | 4 |
| H | 25 | 2.01 | 26.7 | 4 |
| I | 30 | 1.92 | 21.8 | 4 |

*For dye pick-up the following rating scale was employed:
0—No dye pick-up.
1—Light blue shade.
2—Approximately twice the depth of shade 1.
3—Approximately three times the depth of shade 1.
4—Approximately four times the depth of shade 1 (very dark blue)

The tenacity and elongation values set forth in the above table were determined by conventional testing procedures.

The above results indicate that yarns made from the subject resin blends of polypropylene and vinyl chloride-propylene copolymer in accordance with the present invention are suitable for commercial use in view of their dyeability with dispersed dyes and their physical properties.

We claim:

1. A composition comprising polypropylene containing from 1 to 30 percent by weight of vinyl chloride-propylene copolymer wherein the vinyl chloride-propylene copolymer is composed of at least 8 percent by weight of combined propylene and not in excess of 40 percent by weight of combined propylene.

2. The polypropylene fiber or film exhibiting affinity for dispersed dyes, said fiber or film containing from 1 to 30 percent by weight of a vinyl chloride-propylene copolymer wherein the vinyl chloride-propylene copolymer is composed of at least 8 percent by weight of combined propylene and not in excess of 40 percent by weight of combined propylene.

3. The article of claim 2 wherein the vinyl chloride-propylene copolymer is comprised of about between 12 percent and 25 percent by weight of combined propylene.

4. A composition of claim 1 wherein the vinyl chloride-propylene copolymer is comprised of about between 12 percent and 25 percent by weight of combined propylene.

5. An article of claim 3 containing from about 5 to 20 percent by weight of said vinyl chloride-propylene copolymer.

6. A compositions of claim 1 containing from about 5 to 20 percent by weight of said vinyl chloride-propylene copolymer.